United States Patent [19]
Aslam et al.

[11] Patent Number: 5,207,020
[45] Date of Patent: May 4, 1993

[54] BIODEGRADABLE SLIT AND EXPANDED EROSION CONTROL COVER

[75] Inventors: M. Sohail Aslam, Madison; James M. Buckler, Middleton, both of Wis.

[73] Assignee: Research Products Corporation, Madison, Wis.

[21] Appl. No.: 771,198

[22] Filed: Oct. 4, 1991

[51] Int. Cl.$^5$ .................. A01G 1/00; E02D 5/00
[52] U.S. Cl. .................................. 47/9; 405/258
[58] Field of Search ............... 47/56, 95, 25, 32; 405/258, 262, 284, 16, 15

[56] References Cited

U.S. PATENT DOCUMENTS

| | | | |
|---|---|---|---|
| 2,143,461 | 1/1939 | Waring | 47/95 |
| 3,181,273 | 5/1965 | West et al. | 47/95 |
| 3,315,408 | 4/1967 | Fisher | 47/95 |
| 3,762,629 | 10/1973 | Bruno | 47/95 |
| 4,090,325 | 5/1978 | Mushin et al. | 47/95 |
| 4,505,621 | 3/1985 | Hilfiker | 405/284 |
| 5,033,231 | 7/1991 | Sakate et al. | 47/56 |

Primary Examiner—David A. Scherbel
Assistant Examiner—Michele A. Van Patten

[57] ABSTRACT

An erosion control blanket is made of recycled, biodegradable slit and expanded sheets of paper. A plurality of layers are provided and are oriented such that the slope of the baffles in the grid pattern of the paper may be disposed in a positive or negative direction relative to the slope. The upper layers promote runoff of water for reducing erosion. The lower layers trap the water which passes through the blanket, passing it into the soil, and trap loose soil particles. The open grid pattern provided by the slit and expanded paper provides ample air space for promoting the germination and growth of seeds.

15 Claims, 3 Drawing Sheets

BIODEGRADABLE SLIT AND EXPANDED EROSION CONTROL COVER

BACKGROUND OF THE INVENTION

1. Field of the Invention

The subject invention is directed to erosion control products and is particularly directed to biodegradable erosion control blankets.

2. Description of the Prior Art

Erosion control blankets and the like are well known and are used for reducing or minimizing erosion particularly on hillsides and slopes which are barren and reseeded. The blankets reduce rainfall impact, reduce the velocity of runoff water, and shield the soil surface from the wind. The blankets enhance plant growth by moderating soil temperatures and reducing evaporative losses, keeping moisture in the soil where it is available to foster the growth of vegetative cover. Many types of erosion control blankets are currently available such as, by way of example, erosion control blanket products manufactured by North American Green of Evansville, Ind.; Erosion Control Landscape and Construction Products manufactured by American Excelsior Company, Arlington, Tex.; Erosion Control Products manufactured by Geo-Synthetics, Inc., Waukesha, Wis.

Erosion control blanket technology has been continuously advancing over the years, as shown, by way of example, in U.S. Pat. No. 3,315,408 entitled "SOLUBLE FIBROUS MATERIAL FOR CONTROLLING SOIL EROSION" issued to S. G. Fisher Apr. 25, 1967. The Fisher patent discloses a woven grid of a soluble fibrous material which may be placed on a hillside or slope to prevent erosion during the revegetation process. The fibrous material is soluble over a period of time by the natural reaction of the environment and is dissolved as the vegetation takes hold.

U.S. Pat. No. 3,805,446 entitled "MULCHING FILM" issued to K. Aoyagi on Apr. 23, 1974 shows a mulching film of synthetic material having a plurality of slits adapted to permit the plants to sprout through the film. The film is not biodegradable or soluble.

U.S. Pat. No. 3,810,328 entitled "MULCH SHEET" issued to R. C. Brian et al on May 14, 1974 shows a bonded mulch sheet containing a plastic base with a kraft cover.

U.S. Pat. No. 3,955,319 entitled "HORTICULTURAL SHEET MULCH" issued to N. J. Smith on May 11, 1976 discloses a mulch sheet having a plurality of slits for permitting the plants to sprout through the sheet. The sheet is designed to retard weed growth, is typically of a plastic material and is not biodegradable.

U.S. Pat. No. 4,353,946 entitled "EROSION CONTROL MEANS" issued to G. Bowers on Oct. 12, 1982 shows an erosion control blanket made of wood wool fibers which are biodegradable over a period of time and are dissolved into the soil.

SUMMARY OF THE INVENTION

The subject invention is directed to an enhanced biodegradable erosion control blanket which is made from recycled paper and fabricated into a blanket using slit and expanded paper cutting technology. The layers are sewn together with biodegradable cotton thread to ensure uniform thickness and sufficient open areas for optimum grass or seed growth through the blanket. The soil erosion control blanket of the subject invention is an ecologically sound product because it uses all biodegradable materials and is made from recycled paper. It protects the environment by providing an outlet for used paper and yet degrades back into the earth after it contributes to preventing pollution of streams, lakes and rivers. It forms a blanket which provides optimum seed growth and soil erosion control. Each blanket has structured air spaces which define growth cells for providing a protective growth environment with optimum open area to allow the best germination and growth of new vegetation through the blanket while providing superior erosion control properties.

In the preferred embodiment of the invention, the cover is made of a plurality of slit and expanded paper layers. The top and base layers are made of an open pattern with large air spaces and the intermediate layers are made with smaller air spaces. This combination absorbs the energy of the rain drops for protecting from impact erosion and prevents the soil surface from sealing, allowing water to soak into the dry soil and reduce the initial runoff. By properly orienting the slit and expanded paper sheets, the layers can be created with both a positive and negative slope. The slope of the cover layer and the layers adjacent to it are in one direction whereas the slope of the base layer and the layers adjacent to it are in the opposite direction. This orientation permits the grid pattern defined by the slit and expanded sheet to define a roof shingle effect on the upper layers causing water to run off reducing water absorption in the soil and reducing erosion. The opposing direction of the base layer and the layers adjacent to it increases resistance to any water flow that has passed through the blanket, reducing its erosion potential and providing a filtering effect by allowing the suspended soil to be trapped in the blanket and held in the air spaces.

By using the biodegradable paper sheet material, the grid pattern tends to collapse when it gets wet, wherein the baffles created by the grid pattern become flat further enhancing water runoff. The flattening of the baffles also provides a greater surface contact of the blanket with the soil thus providing a less erodible surface to the rain water. As the blanket dries after a rain, the baffles again become stiffer and stand up, increasing the air space for promoting seed germination and growth.

Thus, the subject invention provides a good mulch for seeds sewn below the cover while promoting the germination and shoot emergence of the seeds. The blanket also results in minimal soil erosion while promoting good seed growth. The blanket ultimately dissolves as the seeds grow, eliminating any need for clean-up.

It is, therefore, an object and feature of the subject invention to provide for a biodegradable erosion control cover.

It is a further object and feature of the subject invention to provide an erosion control cover which provides a good mulch for enhancing the germination and growth of seeds sewn below the cover.

It is yet another object and feature of the subject invention to provide for an erosion control cover which minimizes erosion while maximizing the open air space for enhancing germination and growth of a seed bed.

It is a further object and feature of the invention to provide a use for recycled paper which may be dissolved and absorbed into the soil by using the recycled paper as a mulch bed for promoting the growth of new seeds.

Other objects and features of the invention will be readily apparent from the drawings and description of the preferred embodiments which follow.

BRIEF DESCRIPTION OF THE DRAWINGS

The preferred embodiment of the subject invention is best depicted in the drawings, wherein.

DETAILED DESCRIPTION OF THE PREFERRED EMBODIMENT

Figure 1:
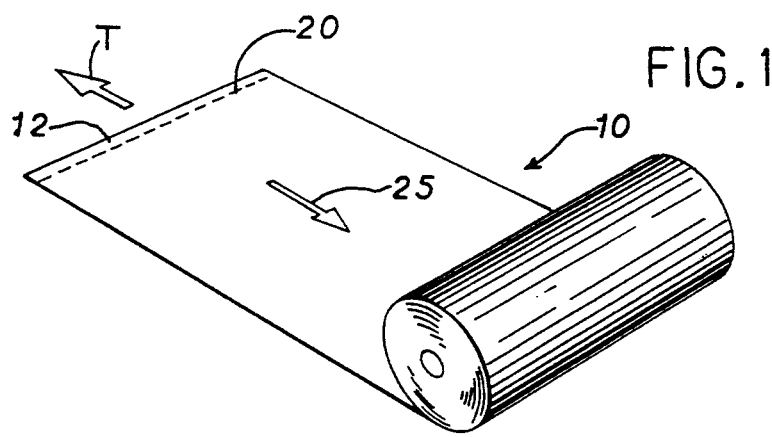
FIG. 1 shows the erosion control blanket of the subject invention in roll form.

The erosion control blanket 10 of the subject invention is shown in FIG. 1 in roll form, as supplied for use. As rolled, the top of the blanket is at the outer free end 12 of the roll so that the roll may be placed at the top of a hillside or the like and rolled down the hillside in proper orientation. In the preferred embodiment of the invention, the erosion control blanket 10 comprises a plurality of layers of slit and expanded sheet material, as depicted at 14, 15, 16, 17 and 18 in FIGS. 2 and 3. When disposed in the roll form shown in FIG. 1, the slits 20 run parallel to the top edge 12 of the roll. Throughout the drawings, the top edge 12 is also indicated by the arrow T since the orientation of the web is an important aspect of the invention.

Figure 5:
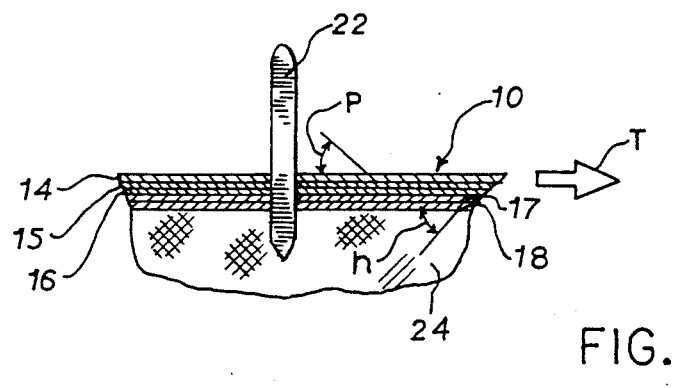
FIG. 5 is a fragmentary sectional view illustrating the erosion control blanket of the subject invention as used in a typical ground cover application.

As delivered in roll form, the sheet material comprising the layers 14–18 is not expanded and the slits 20 run parallel to the top edge 12 of the blanket. As the blanket is rolled out in application, the top edge 12 is generally secured in position such as by applying a staple 22 (see FIG. 5) through the blanket 10 and into the ground 24 to hold the blanket in position. It is desirable that the staple be carefully placed through an open space in all layers to assure optimum performance. As the blanket is unrolled, it is stretched and expanded in a direction generally orthogonal to the directions of the slit 20, i.e. in the general direction of arrow 25 as shown in FIG. 1. This expands the various layers 14–18 of the web into the condition generally shown in FIGS. 2, 3, and 4.

In the preferred embodiment of the invention, the various layers 14–18 of the web comprise recycled biodegradable paper which may be readily cut with scissors or the like to length, allowing the roll to be used to provide a plurality of parallel runs of the erosion control blanket, side-by-side, on a hillside or the like. It will be readily understood that materials other than biodegradable recycled paper may be used to define the various sheet material layers of the erosion control blanket, but there are specific advantages in using the recycled paper since it decomposes readily over a period of time after it is placed in position. As the vegetation emerges through the erosion control blanket, the blanket naturally decomposes eliminating the need for removal and minimizing the risk of creating hazards for future mowing operations and the like. In general, the slit and expanded sheet material for the various layers of the erosion control blanket comprise a pliable, flexible, non-stretchable material.

Figure 2:
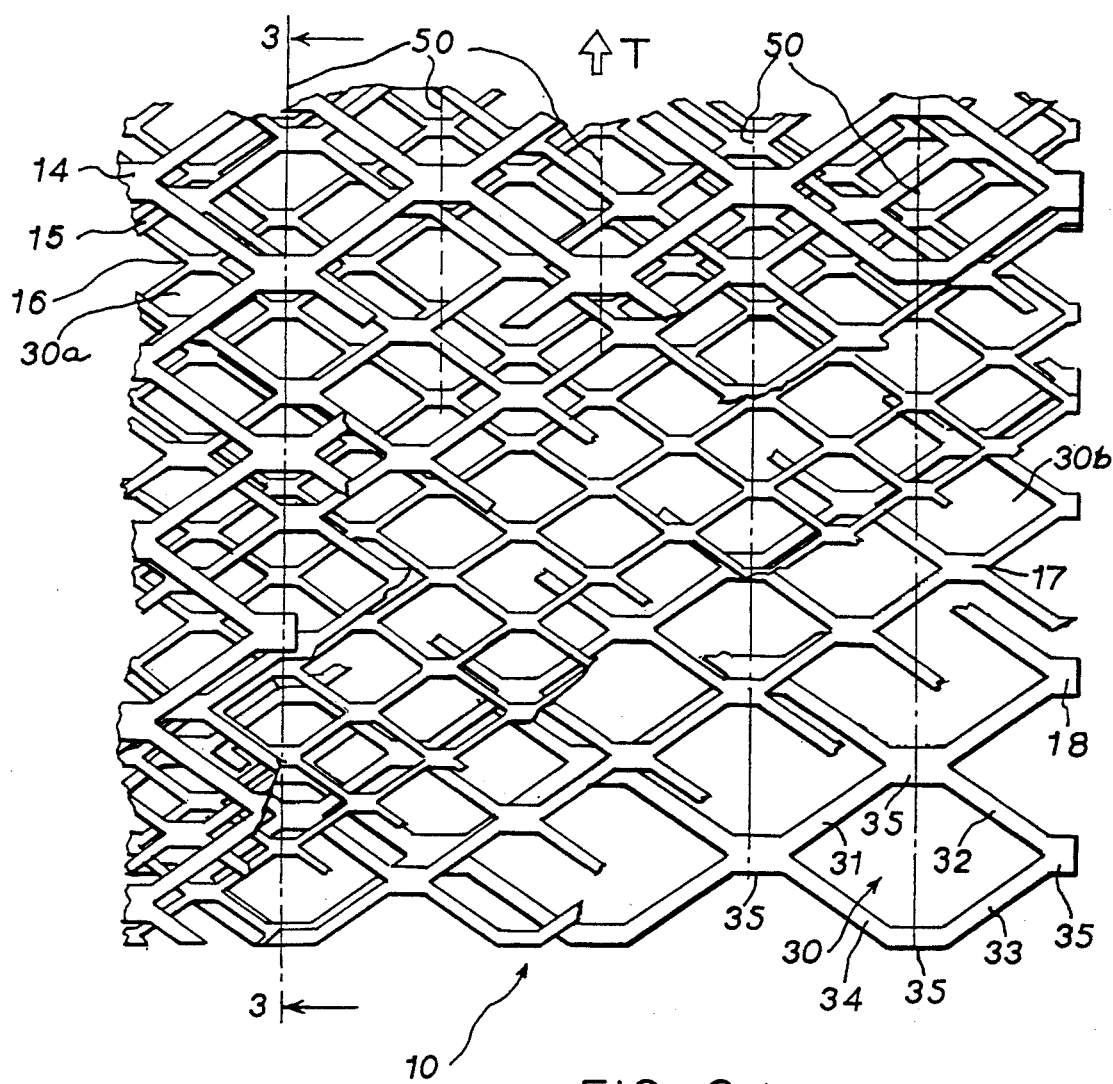
FIG. 2 is a plan view, partially fragmented, showing the erosion control blanket as slit and expanded for application as ground cover.
Figure 3:
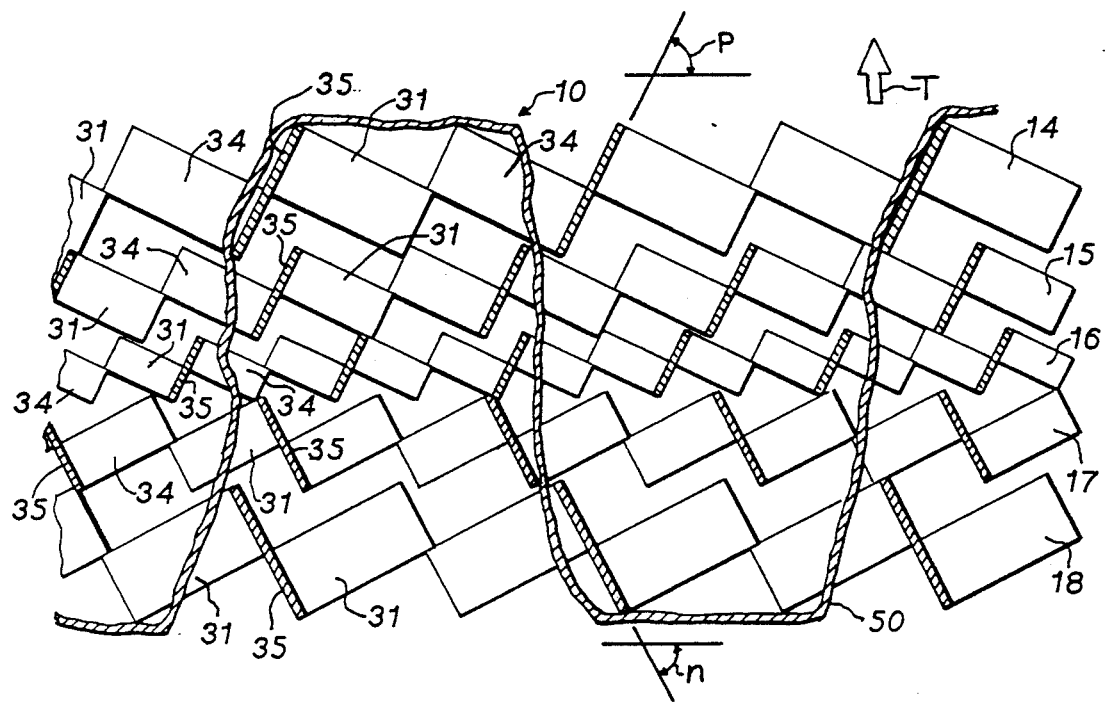
FIG. 3 is a partial section view taken generally along line 3—3 of FIG. 2.

Using the non-stretchable material with the plurality of parallel elongate slits 20 as shown in FIG. 1, the entire sheet can be expanded, without stretching, to define the grid pattern shown in FIGS. 2 and 3, wherein each sheet layer is expanded to provide a plurality of air pockets 30, 30a, 30b in the open center of the grid pattern defined by the slits 20 as the material is expanded. As best shown in FIG. 2, each layer is expanded to define four runners 31, 32, 33 and 34, each intersecting at a central baffle 35 to define the perimeter or boundaries of the air space 30, 30a, 30b.

Figure 4:
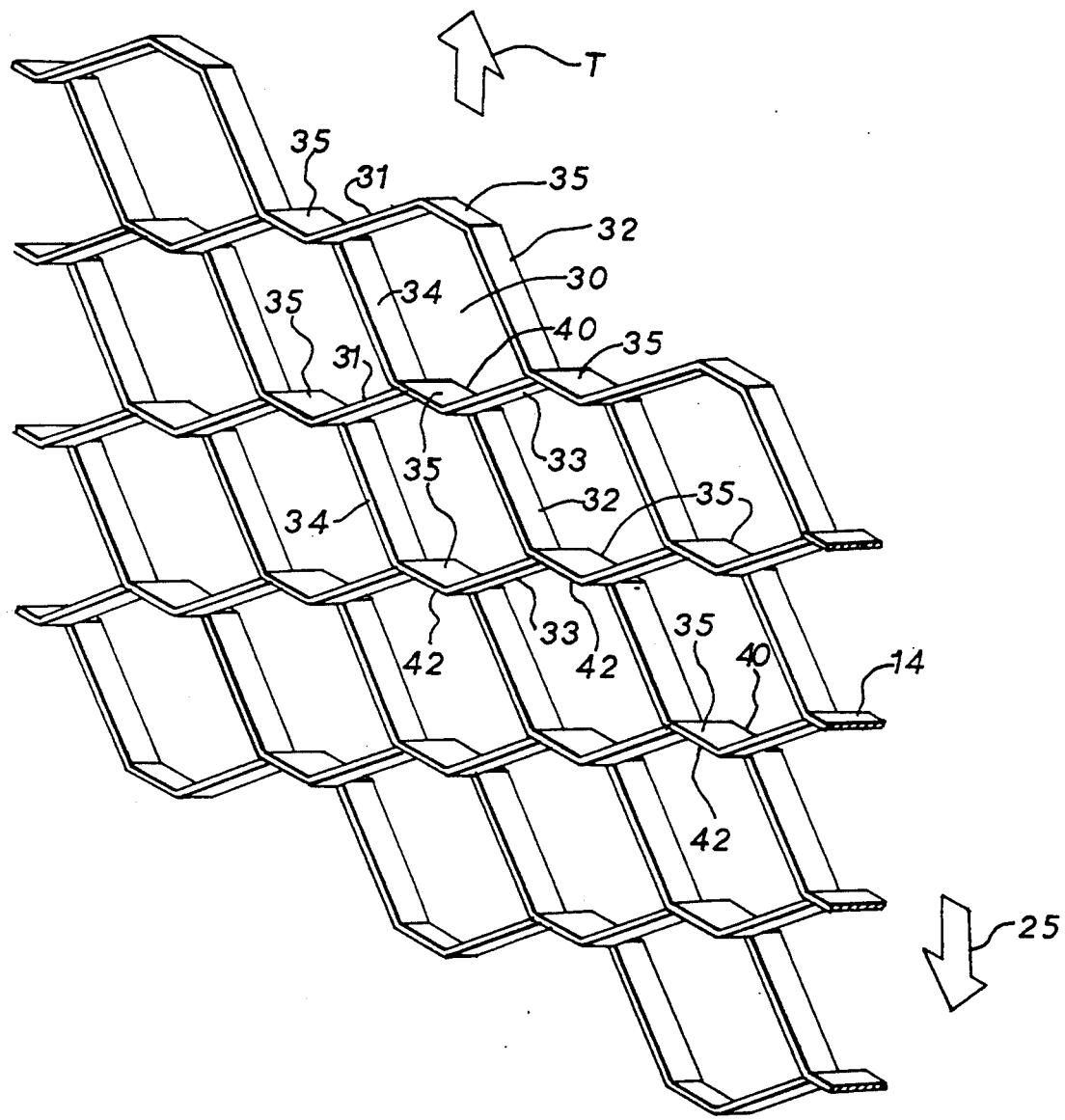
FIG. 4 is a diagrammatic illustration of a single web when slit and expanded to define the erosion control blanket of the subject invention.

In the preferred embodiment of the invention, the erosion control blanket 10 comprises a plurality of layers of sheet material 14, 15, 16, 17 and 18 with varying sized and spaced slits 20 to provide webs with different grid sizes to maximize the effectiveness of the erosion control characteristics of the blanket. Further, as best depicted in FIG. 4, using sheet material layer 14 as an example, when each layer is expanded in the direction of the arrow 25, since the material is generally non-stretchable but pliable, the various runners 31, 32, 33, 34 and baffles 35 are tilted or sloped to intersect the general plane of the sheet material at an acute angle. The slope angle of the web runners and baffles can be positive or negative depending on the orientation of the web relative to the top as indicated by the arrow T. For example, as specifically shown in FIG. 4, each of the lead runners 31 and 32 of each grid pattern project outwardly from the lower edge 40 of the baffle and terminate at the upper edge 42 of the next baffle. This creates a positive slope, wherein from the top down each grid has its leading edge disposed at a lower point than its trailing edge. When the erosion control blanket of the subject invention is positioned on a hillside as shown in FIGS. 2 and 3, this positive slope creates a roof shingle effect for shedding water as it runs down the hillside, directing it away form the soil and reducing erosion.

Again by using FIG. 4 as the example, it can be seen that by inverting the material the slope is reversed to define a negative slope, wherein the leading runners 31 and 32 of each grid pattern would project outwardly and downwardly from the top edge 42 of each baffle and terminate at the lower edge 40 of each baffle. Thus, by disposing the sheet materials in specific orientation, the slope angle of each grid pattern may be controlled to maximize the effect of the erosion control blanket 10.

As shown in FIG. 3, in the preferred embodiment of the invention the erosion control blanket comprises a plurality of layers having both positive slopes p and negative slopes n. As there shown, the erosion control blanket 10 comprises a base layer 18 having a large grid pattern with a negative slope n. An intermediate layer 16 with a positive slope p comprises a small grid pattern defining substantially smaller air spaces 30a, as best seen in FIG. 2. A top or cover layer 14 is disposed above the intermediate layer 16 and also has a positive slope p and air spaces 30 approximately the same size as the air spaces of the base layer 18. While it has been found that the top layer 14 and intermediate layer 16 and base layer 18 provide an adequate erosion control blanket for many applications, it is desirable to provide additional intermediate layers such as the layers 15 and 17 to further enhance the erosion control capability of the blanket. As shown in FIGS. 2 and 3, the intermediate layers 15 and 17 have grid patterns of such a size to define intermediate air spaces 30b which are larger than the air spaces 30a of the primary intermediate layer 16 yet smaller than the air spaces 30 of the top layer 14 and the base layer 18. In the preferred embodiment, the slope of the first intermediate layer 15 is positive and is substantially parallel to the slope p of the top or cover layer 14. The slope of the second intermediate layer 17 is negative and is substantially parallel to the negative slope n of the base layer 18.

In the preferred embodiment of the invention, the various layers 14-18 are maintained in layered relationship by interweaving a plurality of threads such as, by way of example, the biodegradable cotton threads 50.

In application, the five layer control blanket of the subject invention, with the positive and negative slopes for each of the various webs, has achieved consistently superior results over known web or mesh-type erosion control blankets of the prior art. The five slit and expanded paper layers with the base and top layer having a large baffle and the large air spaces 30 and the decreasing air spaces toward the center created by the intermediate layers 15 and 17 and the small center layer 16 provide an erosion control blanket which absorbs the energy of the rain drops falling onto the blanket to minimize impact erosion. The layers also provide a time delay for the water to reach the soil by absorbing some of the water in the absorbent material such as recyclable paper used in the preferred embodiment. This delay provides time for the water to soak into the dry soil and reduces initial runoff. By using the positive and negative slope of the various layers, the positive slope of the top three layers is the same as the general flow of water, providing a roof shingle effect to permit runoff without contact of the water with the soil. The negative slope of the lower two layers create a dam to minimize the runoff and erosion of soil as it is soaked by water. This reduces the erosion potential and provides a filtering effect by allowing the suspended soil to settle and be held in the air spaces 30, 30a and 30b created by the baffles and runners.

The absorbent qualities of recycled paper also tend to create a collapsing action for the grids when they are wet or water soaked, and the baffles tend to lie flat instead of in the sloped angular position, providing an intimate contact with the soil for holding rain water and maintaining a soaked blanket in contact with the soil without promoting erosion. In experimentation, it has been found that the center or intermediate layer 16 does not collapse as the control blanket is soaked, and continues to provide bulk or thickness to the blanket when wet to provide a path for excess water to flow without increasing erosion.

The above combination, when made of a biodegradable material such as recycled paper, also provides a good mulch for seeds sewn below the mat. It does not inhibit germination and shoot emergence from the seeds. It has been found that the erosion control blanket of the subject invention results in minimal soil erosion while promoting very good seed germination and growth.

In laboratory test using the five layer recycled paper erosion control blanket of the preferred embodiment against a mesh-type erosion control blanket such as the fiber blankets made by American Excelsior Company, consistently superior erosion control and growth rate were achieved, as follows:

| | | | EROSION TEST RESULTS | | | |
|---|---|---|---|---|---|---|
| TEST | PLOT | PRODUCT | SOIL WT (20 min) lbs | WATER WT (20 min) lbs | WATER RUNOFF RATE ft 3/hr | SOIL EROSION RATE lbs/hr |
| 1 | 1 | 5 layer mat | 0.95 | 161.6 | 7.77 | 2.85 |
| 1 | 2 | " | 2.00 | 186.5 | 8.97 | 6.00 |
| 2 | 3 | " | 13.5 | 496.0 | 24.09 | 40.91 |
| 1 | 3 | Excelsior mat | 19.0 | 181.0 | 8.70 | 57.00 |
| 2 | 1 | " | 37.8 | 477.3 | 23.28 | 114.55 |

| | | GROWTH TESTS | | | | | | |
|---|---|---|---|---|---|---|---|---|
| | | NUMBER OF PLANTS | | | | PLANT HEIGHT (cm) | | |
| PLOT | PRODUCT | Top | Middle | Bottom | Total | Top | Middle | Bottom | Ave |
| 1 | 5 Layer mat | 80 | 65 | 70 | 216 | 16.95 | 15.71 | 14.18 | 15.61 |
| 2 | " | 70 | 72 | 60 | 202 | 16.24 | 15.13 | 13.23 | 14.87 |
| 3 | Excelsior Mat | 60 | 45 | 40 | 145 | 16.81 | 15.30 | 13.32 | 15.14 |

| | | DRY WEIGHT (gms/sample) | | | | | | |
|---|---|---|---|---|---|---|---|---|
| PLOT | PRODUCT | Top | Middle | Bottom | Total | Lost | Germ | Non-germ |
| 1 | 5 Layer mat | 2.60 | 2.01 | 2.15 | 6.76 | 5.20 | 86.40 | 8.40 |
| 2 | " | 2.17 | 2.32 | 1.71 | 6.20 | 11.60 | 80.80 | 7.60 |
| 3 | Excelsior Mat | 1.75 | 1.31 | 1.92 | 4.98 | 12.40 | 58.00 | 29.60 |

In the test, the slope of the hillside was 2.5:1, rainfall was controlled at 8 inches per hour. In Test 1, the soil was dry before test initiation. In Test 2, the soil was saturated before test initiation. The Excelsior Mat is an erosion control product manufactured by American Excelsior Company, Arlington, Tex.

While specific features and embodiments of the invention have been described herein, it will be readily understood that the invention includes all enhancements and modifications within the scope and spirit of the following claims.

I claim:

1. An erosion control blanket for controlling and limiting the erosion of soil after seeding and during revegetation, the blanket comprising:
 a. a base layer of sheet material, said base layer of sheet material begin slit and expanded for defining a plurality of air spaces of a first predetermined size;
 b. a second layer of sheet material, said second layer of sheet material being slit and expanded for defining a plurality of air spaces of predetermined size smaller than the air spaces of said first predetermined size, each sheet of slit and expanded sheet material comprising a flat, generally planar sheet of pliable, nonstretchable material having a plurality of elongated parallel, through the slits, these slits defining the perimeter of said air spaces when the material is expanded in a direction generally orthogonal to the direction of said elongates slits; and c. means for securing the layers in overlying relationship with one another.

2. The erosion control blanket of claim 1, wherein each of said sheets comprises a biodegradable material.

3. The erosion control blanket of claim 2, wherein said biodegradable material is recycled paper.

4. The erosion control blanket of claim 1, wherein said securing means comprises a biodegradable thread interwoven between said layers.

5. The erosion control blanket of claim 4, wherein said biodegradable thread is a cotton thread.

6. The erosion control blanket of claim 1, further including a first intermediate layer of slit and expanded sheet material interposed between the second layer and the base layer and including a plurality of air spaces each larger than the air spaces of said second layer and smaller than the air spaces of said base layer.

7. The erosion control blanket of claim 1, further including a cover layer of slit and expanded sheet material disposed above said second layer and including air spaces of the same size as the air spaces of said base layer.

8. The erosion control blanket of claim 7, further including a second intermediate layer of slit and expanded sheet material interposed between the second layer and the cover layer and including a plurality of air spaces each larger than the air spaces of said second layer and smaller than the air spaces of said base layer.

9. The erosion control blanket of claim 1, wherein the sheet material, when expanded, comprises an intersecting grid pattern having elongate runners intersecting at baffles defined by the portion of sheet material which is disposed between adjacent slits, and wherein each of the runners intersects the plane of the sheet material at an acute angle.

10. The erosion control blanket of claim 9, wherein the acute angle defines the slope angle for said sheet and wherein said base layer sheet material is of one slope and said second layer is of another slope.

11. The erosion control blanket of claim 10, wherein said one slope is positive and said other slope is negative.

12. The erosion control blanket of claim 11, further including:

a. a cover layer of slit and expanded sheet material disposed above said second layer and including air spaces of the same size as the air spaces of said base layer;

b. a first intermediate layer of slit and expanded sheet material interposed between the second layer and the base layer and including a plurality of air spaces each larger than the air spaces of said second layer and smaller than the air spaces of said base layer; and c. a second intermediate layer of slit and expanded sheet material interposed between the second layer and the cover layer and including a plurality of air spaces each larger than the air spaces of said second layer and smaller than the air spaces of said base layer.

13. The erosion control blanket of claim 12, wherein each layer of the sheet material, when expanded, comprises an intersecting grid pattern having elongate runners intersecting at baffles defined by the portion of said sheet material disposed between adjacent slits, and wherein each of the runners intersect the plane of the sheet material at an acute angle defining a slope angle for each said sheet, and wherein said base layer and said first intermediate layer are disposed at one slope angle and said second layer, said second intermediate layer and said cover layer are, at another slope angle.

14. An erosion control blanket for controlling and limiting the erosion of soil after seeding and during revegetation, the blanket comprising:

a. a base layer of slit and expanded sheet material, said base sheet material being slit and expanded for defining a plurality of air spaces of a first predetermined size;

b. a second layer of slit and expanded sheet material, said second layer of sheet material being slit and expanded for defining a plurality of air spaces of a second predetermined size smaller than the air spaces of said first predetermined size;

c. means for securing the layers in overlying relationship with one another, wherein each sheet of said slit and expanded sheet material comprises a flat, planar sheet of pliable, non-stretchable material having a plurality of elongate parallel, through slits and wherein said slits define the perimeter of air spaces when the material is expanded in a direction generally orthogonal to the elongate slits, the sheet material, when expanded, defining an intersecting grid pattern having elongate runners intersecting at baffles defined by the portion of material disposed between adjacent slits, and wherein each of the runners intersects the plane of the sheet material at an acute angle defining a slope angle for the respective sheet, said base layer being of one slope and said second layer being of another slope.

15. The erosion control blanket of claim 14, further including:

a. a first intermediate layer of slit and expanded sheet material interposed between the second layer and the base layer and including a plurality of air spaces each larger than the air spaces of said second layer and smaller than the air spaces of said base layer, said first intermediate sheet being disposed at a slope angle corresponding to the slope angle of said base layer;

b. a cover layer of slit and expanded sheet material disposed above said second layer and including air spaces of the same size as the air spaces of said base layer, said cover layer being disposed at a slope angle corresponding to the slope angle of said second layer; and c. a second intermediate layer of slit and expanded sheet material interposed between the second layer and the cover layer and including a plurality of air spaces each larger than the air spaces of said second layer and smaller than the air spaces of said base layer, and being disposed at a slope angle corresponding to the slope angle of said second layer.

* * * * *